INVENTOR.
KIYOSHI INOUE

United States Patent Office
3,687,735
Patented Aug. 29, 1972

3,687,735
METHOD OF MANUFACTURING A SOLID ION CONDUCTIVE COMPOSITION
Kiyoshi Inoue, Osaka, Japan, assignor to Nichicon Capacitor Limited, Nakagyo-ku, Kyoto, Japan
Filed Jan. 5, 1970, Ser. No. 632
Claims priority, application Japan, Feb. 13, 1969, 44/10,597; Feb. 28, 1969, 44/15,138; June 4, 1969, 44/43,732
Int. Cl. C04b 33/00; H01m 43/06
U.S. Cl. 136—153                5 Claims

ABSTRACT OF THE DISCLOSURE

A solid electrolytic ceramic formed of at least one metal oxide, an aluminum compound and a sodium salt which affords a high sodium ion concentration and high conductivity and an improved method of manufacture wherein the mixture of materials are sintered to form a substantially unitary mass.

---

This invention relates to solid electrolyte ceramic especially a solid electrolyte ceramic having a high sodium ion conductivity, and to a method of manufacturing it.

There are some solid conductors wherein ions serve as a medium of electric conduction as in the case of liquid electrolytes. Such a so-called solid electrolyte may be used as a material for diaphragms used in chemical reactions and fuel batteries and the like, since the ions can move in the material. As examples of solid electrolytes wherein sodium ions serve as a medium of electric conduction, sodium-silica glass, sodium-silica-alumina, glass, $\beta$-alumina etc., have been known in the art. However, these materials have such a small sodium ion conductivity that they could not sufficiently attain their objects as sodium ion conductive solid electrolytes. In other words, while a resistivity less than several ohm-centimeters is required for use in diaphragms for chemical reactions and the like, there has never been much material practiced until now.

Therefore, an object of this invention is to propose improved solid electrolyte having high sodium ion conductivity.

According to this invention, solid electrolyte ceramics are manufactured by adding a specified amount of oxide of at least one selected from a group consisting of cobalt, titanium, iron, chromium, niobium and magnesium to a composition prepared by mixing at least one aluminum compound selected from a group consisting of aluminum oxides excepting $\alpha$-alumina, aluminum hydroxides and aluminum salts with a sodium salt of 15 to 30 $Na_2O$-calculated molar percents with respect to the $Al_2O_3$-calculated molar number of said aluminum compound, and sintering the mixture.

According to another feature of this invention, the crystal lattice of $\beta$-alumina included in the present ceramic is larger than that of pure $\beta$-alumina ($Na_2O \cdot 11Al_2O_3$), and a diffraction angle $2\theta$ of a crystal plane, e.g. (0,0,16) plane, of $\beta$-alumina included in the present ceramic measured by powder X-ray diffraction using a copper anticathode is less than that of pure $\beta$-alumina by .50 degrees.

Other objects and features of this invention will be more clearly understood by reading the following description with reference to the accompanying drawings.

Figure 1:
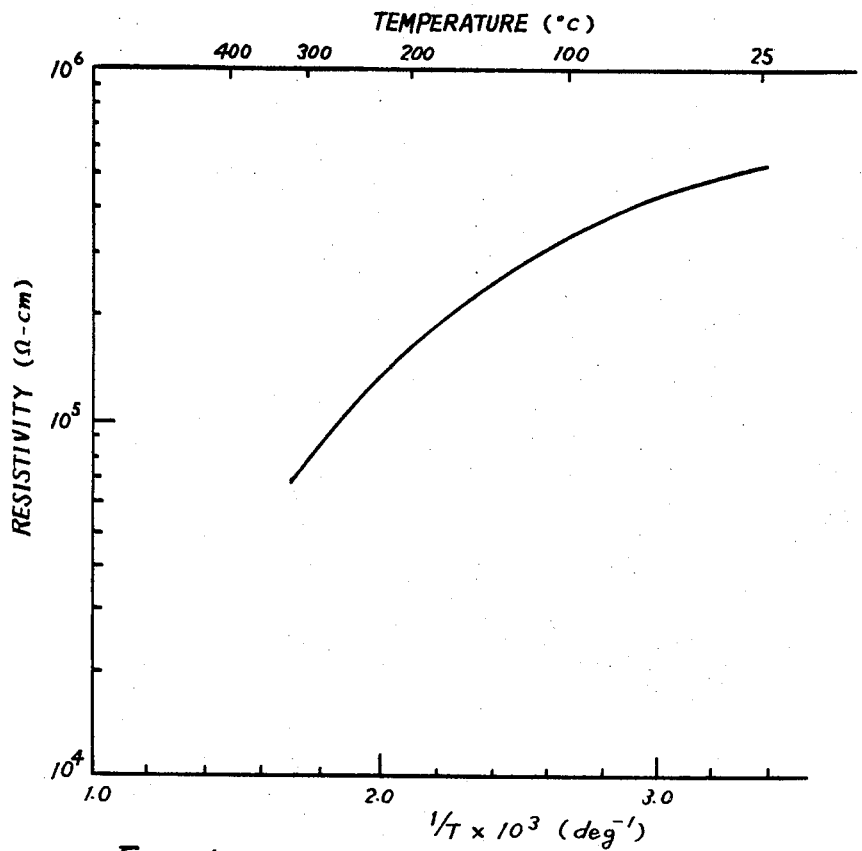
FIG. 1 is a diagram representing resistivity-temperature characteristic of $\beta$-alumina manufactured in accordance with a prior art method.

To improve the sodium ion conductivity of $\beta$-alumina, considered are to increase the number of sodium ions movable in the crystal lattice and to broaden the crystal lattice spacing to reduce a bonding energy of the sodium atoms so that the ions can easily move. The former method of increasing the number of ions has been tried and found experimentally to have a limit. For example, while FIG. 1 is a diagram representing resistivity-temperature characteristic of a ceramic composition manufactured by adding 15 to 30 molar percents of sodium salt to $\alpha$-alumina or normal $\beta$-alumina, the resistivity reaches as high as several tens of thousand ohm-centimeters at 300° C. and is unsuitable for the above purpose. Even though the sodium ion conductivity is substantially improved by use of aluminium oxide excepting $\alpha$-alumina or aluminum salt, the resistivity at 300° C. is yet several ten ohm-centimeters and is insufficient for the above purpose.

Figure 2:
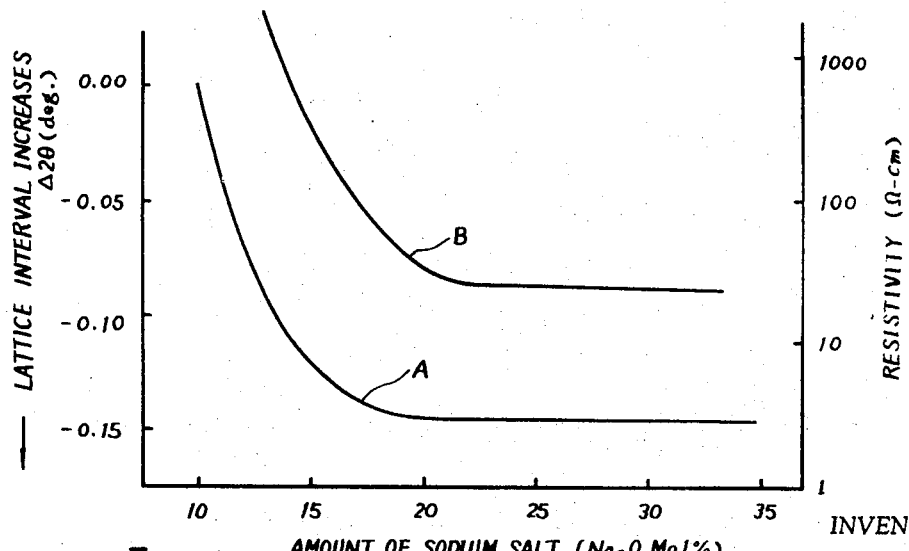
FIG. 2 is a diagram representing variations of an X-ray diffraction angle and a resistivity of $\beta$-alumina with an amount of sodium salt added thereto.

Aiming at the increase of lattice spacing of $\beta$-alumina, the inventor of this invention measured a diffraction angle of the (0,0,16) crystal plane of $\beta$-alumina composition prepared by adding sodium salt of 10 to 35 $Na_2O$-calculated molar percents with respect to the $Al_2O_3$-calculated molar number of aluminum oxides and/or aluminum hydroxides and/or aluminum salts, by powder X-ray diffraction using a copper anticathode, and obtained the result as shown in FIG. 2. A resistivity of the composition was measured also for the purpose of comparison. In the drawing, curve A represents variation of a difference between the diffraction angle $2\theta$ of the samples and pure $\beta$ - alumina ($Na_2O \cdot 11Al_2O_3$) indicated by the lefthand ordinate and curve B represents variation of the resistivity of the sample indicated by the righthand ordinate. The abscissa indicates the $Na_2O$-calculated molar percent of added sodium salt. As clearly shown in the drawing, it has been found that, while the diffraction angle difference increases toward the negative direction, i.e. the direction of increase of lattice spacing, when sodium salt is added more than about 10 molar percents, it does not vary and the lattice spacing no longer increases in the range above about 20 molar percents. As also shown in the drawing, the tendency of variation of the diffraction angle is substantially same as that of the resistivity. This result of experiment suggests that the ion conductivity of $\beta$-alumina has a relation to the lattice spacing to reduce the bonding energy of the sodium atoms by substituting the aluminum atoms with other suitable atoms.

Figure 3:
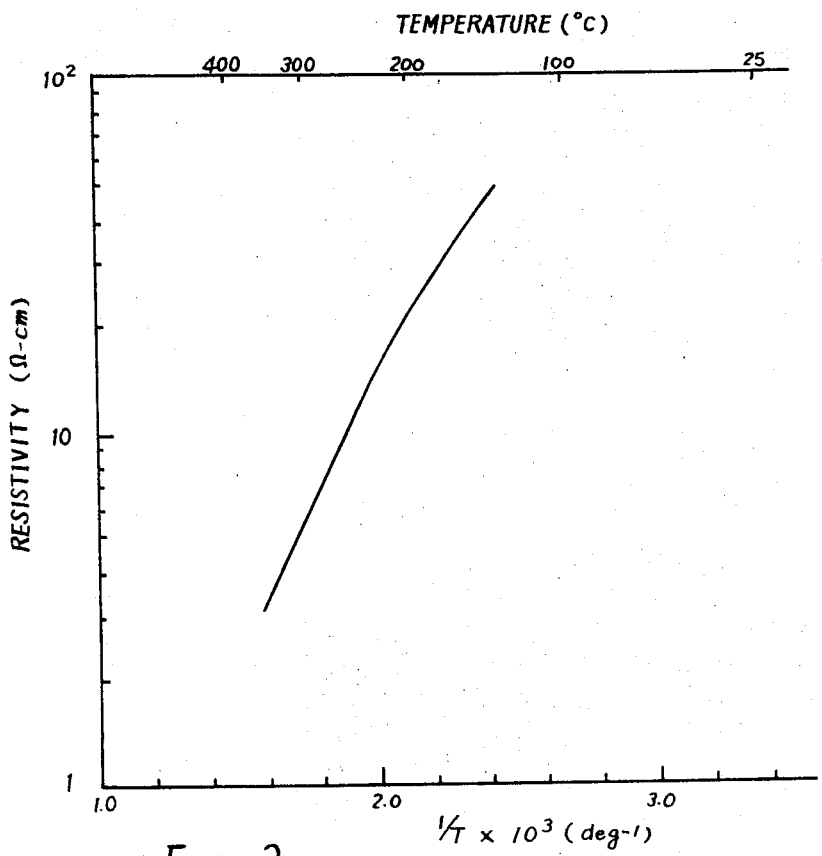
FIG. 3 is a diagram representing resistivity-temperature characteristic of $\beta$-alumina manufactured in accordance with one embodiment of this invention.

Based upon the abovementioned suggestion, the inventor of this invention discovered that conductivity of β-alumina including sodium ions can be remarkably improved by adding metals in oxide form, such as cobalt, titanium, iron, chromium, niobium, and magnesium, each having a little larger ionic radius than that of aluminum. FIG. 3 represents resistivity-temperature characteristic of one embodiment thereof. In comparison this drawing with FIG. 1 showing a prior art, it is found that the sodium ion conductivity has been increased as high as about $10^4$ times. Now the description will be made in connection with several examples as the under.

EXAMPLE 1

321.8 gms. of $Al_2O_3 \cdot 3H_2O$ and 54.7 gms. of $Na_2CO_3$ were mixed with an appropriate amount of ethylalcohol for about 24 hours and the mixture was prefired in air at 1200° C. for 3 hours. The block after the prefiring was ground into an appropriate particle size and 7.6 gms. of $Co_2O_3$ was added thereto and again mixed with an appropriate amount of ethylalcohol for about 24 hours. The mixture was added with 3.0 percent by weight of organic resin as binder and then formed into a predetermined shape. The formed body was fired and sintered in air at 1650° C. for 30 minutes and then gold electrodes were provided by evaporation onto the both surfaces of the sintered body. The resistivity at 300° C. was measured as 5.5 ohm-centimeters.

EXAMPLE 2

327.0 gms. of $Al_2O_3 \cdot 3H_2O$ and 55.6 gms. of $Na_2CO_3$ were mixed, prefired and ground in the same manner as Example 1, and 3.7 gms. of $TiO_2$ was added thereto. A sintered body was formed and resistivity thereof was measured in the same manner as Example 1. Thus the value was obtained as 6.1 ohm-centimeters.

EXAMPLE 3

162.5 gms. of $Al_2O_3$, 41.3 gms. of $Na_2CO_3$ and 5.6 gms. of $CoO_3$ were mixed with an appropriate amount of ethylalcohol for about 24 hours and the mixture was then purified in air at 1200° C. for 3 hours. The block after the prefiring was ground into an appropriate particle size, mixed with 3.0 percents by weight of organic binder and an appropriate amount of ethylalcohol and formed into the predetermined shape. The formed body was fired and sintered in air at 1670° C. for 30 minutes and then gold electrodes were provided in the same manner as Example 1. Measurement of resistivity exhibited 5.0 ohm-centimeters.

While aluminum oxide anhydride and aluminum oxide trihydride were adopted in the above examples, the same results can be obtained by use of any aluminum oxide excepting α-alumina, aluminum hydroxide or aluminum salt. Sodium salts other than sodium carbonate may be used suitably. It has been found that the preferable amount of addition of sodium salt is within 15 to 30 percent by $Na_2O$-calculated molar number with respect to the $Al_2O_3$-calculated molar number of the aluminum compounds. That is to say, below 15 molar percent, the sintering temperature must be above 1800° C. and, on the other hand, above 30 molar percent, sodium evaporated severly, so that sintering was difficult in the both conditions. Moreover, even if the amount of addition of sodium salt was varied within this range, there was no appreciable difference in the risistivities (i.e. sodium ion conductivities) of the sintered bodies.

Figure 4:
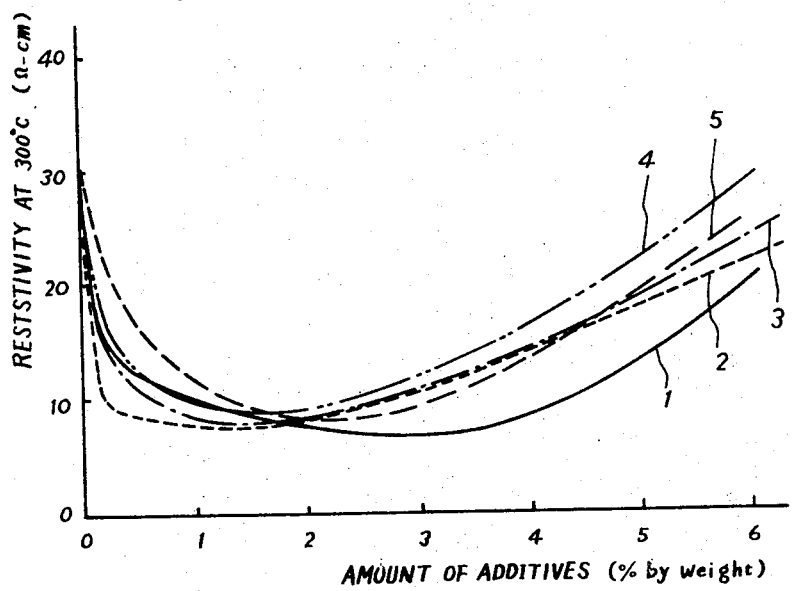
FIG. 4 is a diagram representing a relation between a resistivity of $\beta$-alumina manufactured in accordance with the embodiment of FIG. 3 and an amount of metal oxide added.

FIG. 4 represents an experimental result showing a relation between the amount of addition of the metal oxides which are the feature of this invention and the resistivity at 300° C. In the drawing, curves 1, 2, 3, 4, and 5 indicate the cases of addition of cobalt oxide, titanium oxide, chromium oxide, iron oxide and niobium oxide, respectively. Referring now to curve 1 (cobalt oxide) as an example, the lowest resistivity, 5 ohm-centimeters, appears at about 3 percent by weight of additive. Less than 0.1 percent by weight of additive has no appreciable effect. The resistivity gradually increases with increase of the amount of additive and, above 6 percent by weight of resistivity, becomes to almost less it substantial worth in application. It will be found that this tendency is almost true also in the other metal oxides and a range from 1.5 to 2.5 percent by weight is preferable for the object of this invention.

While oxidizing atmosphere was adopted for firing in the above examples, no substantial difference in characteristics appeared when firing was carried out in neutral or reducing atmosphere.

Figure 5:
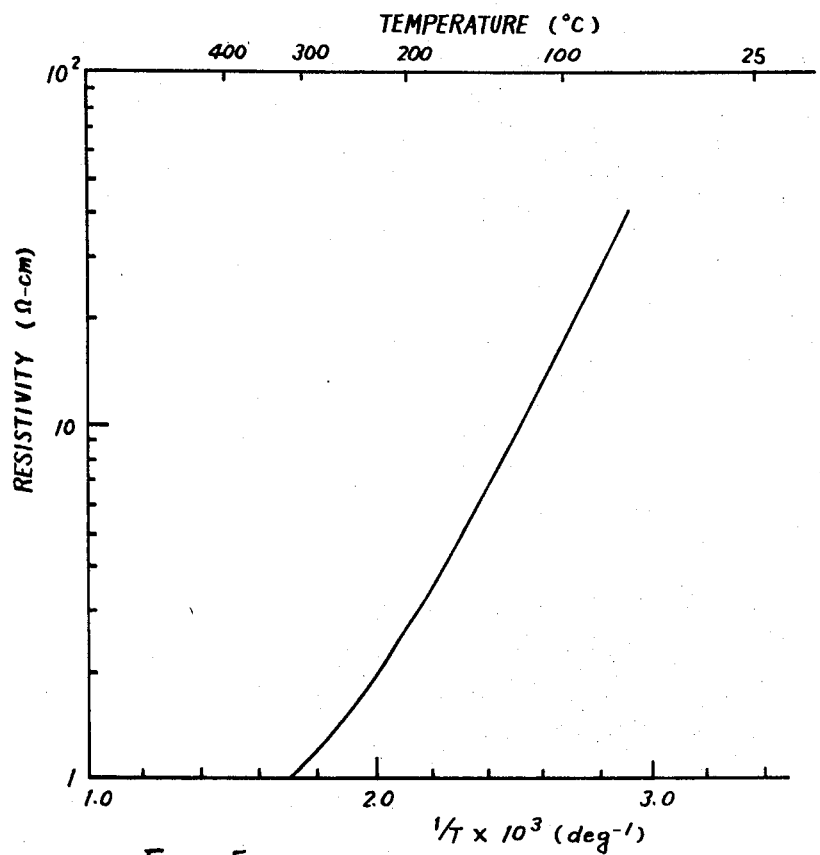
FIG. 5 is a diagram, similar to FIG. 3, representing resistivity-temperature characteristic of $\beta$-alumina manufactured in accordance with another embodiment of this invention.

After further investigation, the inventor of this invention has discovered a fact that resistivity of the sintered body can be reduced by simultaneously adding both oxides of titanium and cobalt among the above metal oxides. FIG. 5 shows a resistivity-temperature characteristic of an embodiment according to this method. As clearly found from comparison of this drawing with FIG. 1, about $2 \times 10^4$ times sodium ion conductivity can be obtained with respect to the case having no additional metal oxide, according to this inventive method. Several examples will be described in the under.

EXAMPLE 4

327.0 gms. of $Al_2O_3 \cdot 3H_2O$ and 55.6 gms. of $Na_2CO_3$ were stirred with ethylalcohol for 24 hours and the mixture was prefired at 1200° C. for 3 hours. The resultant block after the prefiring was ground into an appropriate particle size and added with 3.7 gms. of $TiO_2$ and 7.6 gms. of $Co_2O_3$. The composition was again stirred with ethylalcohol and the mixture was added with 3 percent by weight of organic resin, then formed into the predetermined shape and sintered at 1670° C. for 30 minutes. Gold electrodes were evaporated onto the both surfaces of the sintered body. Measurement of resistivity at 300° C. exhibited 4.1 ohm-centimeters.

EXAMPLE 5

327.0 gms. of $Al_2O_3$, 55.6 gms. of $Na_2CO_3$, 3.7 gms. of $TiO_2$ and 11.2 gms. of $Co_2O_3$ were stirred with an appropriate amount of ethylalcohol for 24 hours and the mixture was prefired at 1200° C. for 3 hours. The resultant block was ground into an appropriate particle size, then mixed with 3 percent by weight of organic resin and formed into the predetermined shape. The formed body was sintered at 1570° C. for 30 minutes and resistivity was measured in the same manner as Examples 4 to obtain 3.1 ohm-centimeters.

EXAMPLE 6

162.5 gms. of $Al_2O_3$, 41.3 gms. of $Na_2CO_3$, 2.7 gms. of $TiO_2$ and 5.6 gms. of $Co_2O_3$ were processed in the same manner as Example 5. Measurement of resistivity of the resultant sintered body gave 1.6 ohm-centimeters.

EXAMPLE 7

162.5 gms. of $Al_2O_3$, 41.7 gms. of $Na_2CO_3$, 2.7 gms. of $TiO_2$ and 8.3 gms. of $Co_2O_3$ were processed in the same manner as Example 5. Measurement of resistivity of the resultant sintered body gave 1.1 ohm-centimeter.

As clarified by the abovementioned examples, remarkable high ion conductivity can be obtained when both $TiO_2$ and $Co_2O_3$ are simultaneously added, as compared with the case when one of them is singly added. It is difficult to obtain such high ion conductivity even if oxides of metal other than titanium and cobalt are added in combination.

The following Table 1 represents the results of experiments carried out for deciding the optimum range of amount of addition of $TiO_2$ and $Co_2O_3$.

TABLE 1

| Composition | Mol percent | Additives | Amount of additives (weight percent) | Sintering temperature (° C.) | Resistivity at 300° C. (ohm-cm.) |
|---|---|---|---|---|---|
| Normal β-alumina | | | | 1,700 | 50,000 |
| $Al_2O_3.3H_2O$ | 80 | | | 1,650 | 30.7 |
| $Na_2CO_3$ | 20 | | | | |
| $Al_2O_3.3H_2O$ | 80 | $TiO_2$ | 1.48 | 1,650 | 7.9 |
| $Na_2CO_3$ | 20 | | | | |
| $Al_2O_3.3H_2O$ | 80 | $Co_2O_3$ | 3.04 | 1,670 | 6.7 |
| $Na_2CO_3$ | 20 | | | | |
| $Al_2O_3.3H_2O$ | 80 | $TiO_2$ | 1.48 | 1,660 | 4.1 |
| $Na_2CO_3$ | 20 | $Co_2O_3$ | 3.04 | | |
| $Al_2O_3.3H_2O$ | 80 | $TiO_2$ | 0.740 | 1,650 | 4.2 |
| $Na_2CO_3$ | 20 | $Co_2O_3$ | 0.762 | | |
| $Al_2O_3.3H_2O$ | 80 | $TiO_2$ | 0.740 | 1,670 | 3.9 |
| $Na_2CO_3$ | 20 | $Co_2O_3$ | 4.48 | | |
| $Al_2O_3.3H_2O$ | 80 | $TiO_2$ | 1.48 | 1,670 | 3.1 |
| $Na_2CO_3$ | 20 | $Co_2O_3$ | 4.48 | | |
| $Al_2O_3.3H_2O$ | 75 | $TiO_2$ | 1.48 | 1,640 | 2.9 |
| $Na_2CO_3$ | 25 | $Co_2O_3$ | 4.48 | | |
| $Al_2O_3$ | 80 | $TiO_2$ | 1.48 | 1,660 | 1.6 |
| $Na_2CO_3$ | 20 | $Co_2O_3$ | 3.04 | | |
| $Al_2O_3$ | 80 | $TiO_2$ | 1.48 | 1,670 | 1.1 |
| $Na_2CO_3$ | 20 | $Co_2O_3$ | 4.48 | | |
| $Al_2O_3$ | 75 | $TiO_2$ | 1.48 | 1,640 | 1.0 |
| $Na_2CO_3$ | 25 | $Co_2O_3$ | 4.48 | | |
| $Al_2O_3$ | 80 | $TiO_2$ | 1.48 | 1,670 | 1.2 |
| $Na_2CO_3$ | 20 | $Co_2O_3$ | 5.92 | | |
| $Al_2O_3$ | 80 | $TiO_2$ | 0.740 | 1,670 | 1.1 |
| $Na_2CO_3$ | 20 | $Co_2O_3$ | 5.92 | | |

For the purpose of comparison, the table includes the both cases when no additive is adopted and when either of $TiO_2$ or $Co_2O_3$ is singly added. From these experiments, it is found that the amount of the each additive $TiO_2$ or $Co_2O_3$ exhibits the desired effect at about 0.1 to 10.0 percent by weight, condition control becomes difficult since the sintering temperature becomes above 1700° C. and, at the same time, the resistivity also increases to cancel the effect.

Now, examples wherein $\Delta 2\theta$ for the crystal plane (0,0,16) was measured by X-ray diffraction technique as described in the preface will be described hereinafter.

EXAMPLE 8

327.0 gms. of $Al_2O_3$ and 55.6 gms. of $Na_2CO_3$ were stirred with an appropriate amount of ethylalcohol for about 24 hours and the mixture was prefired at 1200° C. for 3 hours. The resultant block was ground into an appropriate particle size and added with 3.70 gms. of $TiO_2$ and 7.60 gms. of $Co_2O_3$. The composition was again stirred with an appropriate amount of ethylalcohol for about 24 hours, then added with 3.0 percent by weight of organic resin and formed into the predetermined shape. The shaped body was sintered at 1670° C. for 30 minutes and measured the resistivity at 300° C. in the same manner as Example 1. The measured resistivity was 4.1 ohm-centimeters. The value of $\Delta 2\theta$ measured by the above mentioned technique was —0.26 degree.

EXAMPLE 9

The processes to prefiring were carried out in the same manner as Example 8 and the resultant block was ground appropriately, added with 3.70 gms. of $TiO_2$, 7.60 gms. of $Co_2O_3$ and 3.90 gms. of $MgCO_3$ and formed in the same manner as Example 8. The formed body was sintered at 1670° C. for 60 minutes. The resistivity of the sintered body at 300° C. was 3.6 ohm-centimeters and $\Delta 2\theta$ was —0.29 degree.

EXAMPLE 10

327.0 gms. of $Al_2O_3.3H_2O$, 55.6 gms. of $Na_2CO_3$, 3.7 gms. of $TiO_2$ and 11.20 gms. of $Co_2O_3$ were stirred with an appropriate amount of ethylalcohol for about 24 hours and the mixture was prefired at 1200° C. for 3 hours. The resultant block was ground into an appropriate particle size, added with 3.0 percent by weight of organic resin and an appropriate amount of ethylalcohol and formed into the predetermined shape. The shaped body was sintered at 1670° C. for 30 minutes. Resistivity of the sintered body at 300° C. was 33.1 ohm-centimeters and $\Delta 2\theta$ was —0.31 degree.

EXAMPLE 11

162.5 gms. of $Al_2CO_3.3H_2O$, 41.3 gms. of $Na_2CO_3$, 2.70 gms. of $TiO_2$ and 5.60 gms. of $Co_2O_3$ were processed in the same manner as Example 10 to prepare a shaped body. It was then sintered at 1670° C. for 60 minutes. Resistivity of the sintered body at 300° C. was 1.6 ohm-centimeter and $\Delta 2\theta$ was —0.38 degree.

Figure 6:
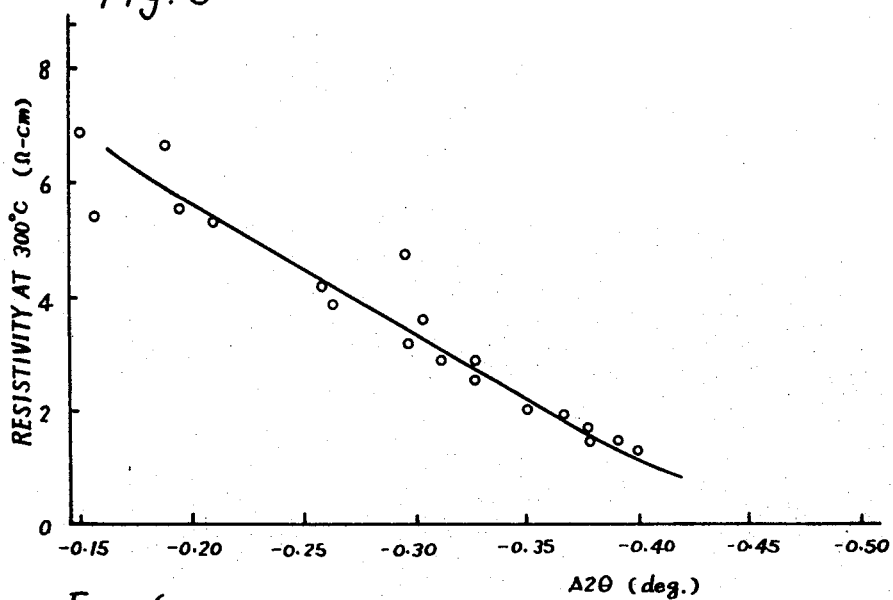
FIG. 6 is a diagram representing a relation between a resistivity and an X-ray diffraction angle.

FIG. 6 shows a diagram wherein resistivities at 300° C. obtained from repetition of similar experiments are plotted with respect to $\Delta 2\theta$. As found in the drawing, an approximately linear relation is established between the both. In other words, below 0.2 degree in absolute value $\Delta 2\theta$, resistivity is as high as several ohm-centimeters and insufficient for practical use. However, with increase of $\Delta 2\theta$ therefrom, sodium ion conductivity increases, and resistivity drops down to about one ohm-centimeter in the vicinity of —0.4 degress of $\Delta 2\theta$. However, it has been found that the ion conductivity does not increase above —0.5 degree of $\Delta 2\theta$ since the eutectic limit of the additives is overtaken.

The above description was made only in conjunction with the embodiments of this invention, and this invention is not limited thereto. It is of course that the above embodiments can be modified without escapement from the spirit and scope of this invention. For example, any medium other than ethylalcohol may be used for mixing the materials unless it does not affect badly and the stirring time may be selected arbitrarily such as 10 to 30 hours. Moreover, any binder for shaping other than resin may be adopted, and the temperature of prefiring and sintering may be selected arbitrarily in accordance with a purpose of use. These modifications belong to the range of this invention but are not the characteristics of the invention.

What is claimed is:

1. A method of manufacturing ceramic composition comprising the steps of mixing 0.1 to 10.0 percent by weight of $TiO_2$ and 0.1 to 10.0 percent by weight of $Co_2O_3$ with a composition comprising at least one material selected from the group consisting of aluminum oxides excepting alpha-alumina, aluminum hydroxides and aluminum salts mixed with a sodium salt, the molar ratio of the sodium salt to the aluminum compound being selected to provide 15 to 30 percent of the sodium salt, and then sintering the resultant mixture.

2. The method according to claim 1 wherein the X-ray diffraction angle $2\theta$ of the crystal plane of beta-alumina included in the ceramic is less than that of pure beta-alumina by an angle of 0.20 to 0.50 degree.

3. The method according to claim 1 including the steps of grinding said material selected from said group and said sodium salt, mixing said ground material with ethyl-alcohol, forming a block from the resulting mixture, drying the block, grinding said dried block to form particles of predetermined size, and then mixing said ground particles with said $TiO_2$ and $Co_2O_3$.

4. The method according to claim 3 including the step of adding an organic binding resin to the last said mixture.

5. The method according to claim 1 including the step of depositing electrodes on two opposite surfaces of said sintered body.

References Cited
UNITED STATES PATENTS

| | | | |
|---|---|---|---|
| 3,446,677 | 5/1969 | Tennenhouse | 136—153 |
| 3,499,796 | 3/1970 | Hever et al. | 136—153 |
| 3,535,163 | 10/1970 | Dzieciuch et al. | 136—153 |

DONALD L. WALTON, Primary Examiner

U.S. Cl. X.R.

106—39, 62, 65, 66; 136—175